(12) United States Patent
Thrash, Jr. et al.

(10) Patent No.: US 7,243,671 B2
(45) Date of Patent: Jul. 17, 2007

(54) CHATTER RESISTANT SHUTTLE VALVE

(75) Inventors: Thomas B. Thrash, Jr., Houston, TX (US); Rodney C. Hope, Sugar Land, TX (US)

(73) Assignee: Gilmore Valve Co., Ltd., Houston, TX (US)

( * ) Notice: Subject to any disclaimer, the term of this patent is extended or adjusted under 35 U.S.C. 154(b) by 0 days.

(21) Appl. No.: 11/564,829

(22) Filed: Nov. 29, 2006

(65) Prior Publication Data
US 2007/0102042 A1    May 10, 2007

Related U.S. Application Data

(62) Division of application No. 10/604,676, filed on Aug. 8, 2003, now Pat. No. 7,159,605.

(51) Int. Cl.
*F16K 11/07* (2006.01)

(52) U.S. Cl. ........................ 137/112; 251/50

(58) Field of Classification Search ............... 137/112, 137/113, 514, 514.5; 251/50
See application file for complete search history.

(56) References Cited

U.S. PATENT DOCUMENTS

| | | | | |
|---|---|---|---|---|
| 2,821,972 A | * | 2/1958 | Banker ....................... 123/434 |
| 3,533,431 A | * | 10/1970 | Kuenzel et al. ............. 137/113 |
| 3,633,606 A | * | 1/1972 | Hay et al. ................... 137/113 |
| 4,253,481 A | * | 3/1981 | Sarlls, Jr. .................... 137/112 |
| 6,257,268 B1 | * | 7/2001 | Hope et al. ................. 137/112 |
| 6,318,400 B1 | * | 11/2001 | Hope et al. ................. 137/112 |
| 6,655,405 B2 | * | 12/2003 | Hollister et al. ............ 137/102 |

* cited by examiner

*Primary Examiner*—Stephen M. Hepperle
(74) *Attorney, Agent, or Firm*—Blackwell Sanders Peper Martin LLP

(57) ABSTRACT

A chatter resistant shuttle valve is provided to direct fluid flow from at least two sources of pressurized fluid to a downstream apparatus. The shuttle valve includes a valve body with a shuttle valve member movably mounted inside. A dampening chamber is provided which dampen opening movement of the shuttle as it moved from a closed position on one side of the shuttle toward a closed position on the other end of the shuttle. One or more dampening chambers may be provided.

7 Claims, 5 Drawing Sheets

CHATTER RESISTANT SHUTTLE VALVE

CROSS REFERENCE TO RELATED APPLICATION

This Application is a Divisional Application of application Ser. No. 10/604,676 filed Aug. 8, 2003 now U.S. Pat. No. 7,159,605, of the same title, the disclosure of which is incorporated herein by reference.

BACKGROUND OF INVENTION

Shuttle valves are well known in the industry. See for example U.S. Pat. No. 4,253,481 which discloses a cushioned shuttle valve. Shuttle valves generally have two inlets and one outlet. The shuttle valve member inside the valve body moves from a position allowing fluid to flow from a first inlet to the outlet when the pressure in the first inlet is higher than the pressure in a second inlet. When the pressure in the second inlet exceeds the pressure in the flow passage now defined by the first inlet and the outlet, the shuttle will move from its position closing the second inlet to a position closing the first inlet and opening the second inlet thereby changing the flow path. The fluid may also flow in a reverse direction from the outlet to the inlets.

In some applications, particularly those in sub-sea oil production, the ambient pressures operating on the valve may be extremely high in excess of 2,000 psi. Certain of the shuttle valves used in such applications were found to have the shuttle oscillate between the valve seats causing chatter during opening movement. The frequency of oscillation in high ambient pressure conditions could be as high as 20 oscillations per second. Pressure oscillation can, if of a high magnitude, cause damage to the valve and other equipment to which it is connected, similar to "water hammer" which can occur in certain piping systems with a sudden change in flow for example the sudden closing of a valve. "Hammer" has been found to be particularly pronounced when high velocity flow rates are used.

Such shuttle valves may be employed in connection with underwater oil field equipment. For example, the lower ends of two hydraulic fluid accumulators (tanks with air space in the top) may be tied to the inlets of a shuttle valve. Each of two high pressure flow lines feeding the accumulators may be connected thereto between the shuttle valve and one of the tanks. The outlet may be connected to a hydraulic cylinder on a blow out preventer. The outlet of the shuttle valve will supply fluid from whichever one of the flow lines is the higher pressure.

It is especially important that underwater shuttle valves have a long trouble-free life because of their inaccessibility and the extreme expenses to replace or repair one. Additionally, the shuttle valve and the hydraulic system should operate to prevent collapse of the flexible hydraulic supply lines. Due to the high working pressures, up to several thousand (e.g. 5,000) psi the possible differential pressure on shuttle valves can be very high. Sometimes a resulting high momentum of a shuttle as it moves uncontrolled from one seat to the other seat creates enough impact to break or crack the cage or cause it to be warped thus disrupting proper valve operation. Thus, slowing down of the shuttle during at least a portion of its opening movement can reduce the final speed of the shuttle as it moves toward a closed position against a valve seat and reduce shuttle oscillation.

Thus, there is a need for an improved shuttle valve which requires few parts in order to effect smooth operation.

SUMMARY OF INVENTION

The present invention involves the provision of a shuttle valve which will provide a smooth opening movement with an extended opening time to help prevent opening of the valve by stray pressure waves. The invention involves the provision of a shuttle valve which does not require the inclusion of additional parts that would be subject to wear or breakage to be added to a shuttle valve to effect the control of shuttle movement. The invention also involves the provision of a shuttle valve which through control of the fit of certain of its parts can be used to control shuttle movement without affecting its normal operation. The invention also involves the provision of a shuttle valve which may be ganged together to form a series of shuttle valves. The present invention also involves the provision of a shuttle valve design which may be utilized as a double ended shuttle valve controlling opening movements in two directions and which design may be used as a shuttle valve which controls the opening movement in only one direction. The present invention also involves the provision of a shuttle valve utilizing a variable volume chamber with restricted access for fluid ingress to control shuttle opening movement.

BRIEF DESCRIPTION OF DRAWINGS

Like numbers throughout the various Figures designate like or similar parts.

DETAILED DESCRIPTION

Figure 1:
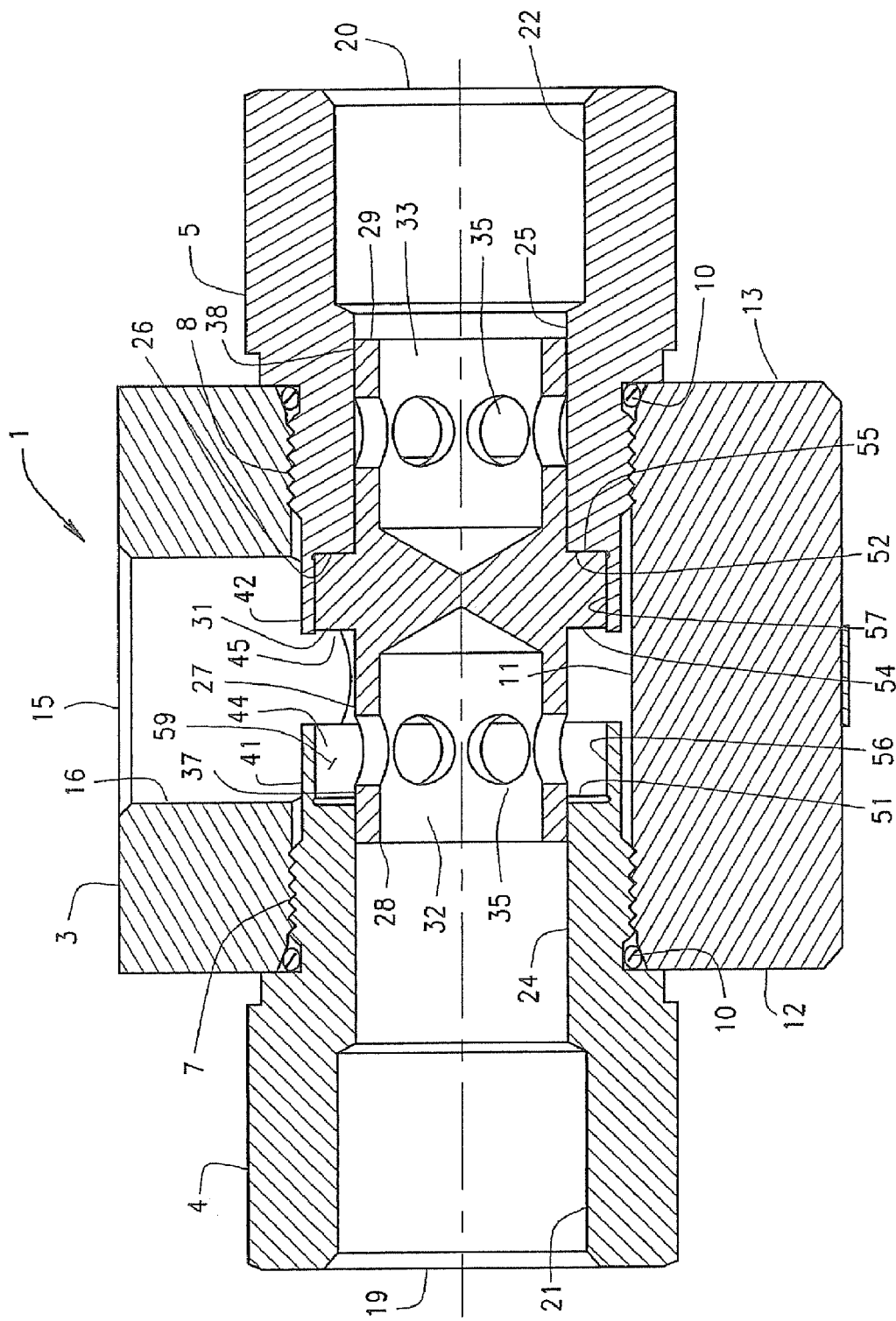
FIG. 1 is a cross sectional side elevation view of a shuttle valve which utilizes controlled opening movement in two directions.

The valve of FIG. 1 will first be described. The valve, designated generally 1, includes a valve body 3 having mounted therein opposed coaxial adapters 4, 5 mounted to the body 3 as by threaded engagement at 7, 8 respectively. The adapters 4, 5 may be sealed to the body 3 as with O-rings 10 or the like. The body 3 has a throughbore 11 which passes between opposite ends 12, 13 of the body 3. The body 3 is also provided with an outlet 15 which is part of an outlet passage 16 which is shown as generally perpendicular to the bore 11 and connected in flow communication thereto. The adapters 4, 5 each have an inlet 19, 20, respectfully, and a flow passage 21, 22 respectively. Preferably, the passages 16, 21, 22, are round in transverse cross-section, as best seen in FIG. 1 the passage is 21, 22, each have a reduced diameter portion 24, 25 respectively, sized and shaped to receive for axial movement therein, the shuttle 27. The inlets 19, 20 may be connected to source equipment, as for example accumulators, hydraulic pump, etc., not shown, the outlet 15 may be connected to downstream apparatus for flow communication therebetween. The portions 24, 25 function as receptacles for tubular member portions 28, 29 of the shuttle 27. At least one dampening chamber 26 is provided which controllably fills with working fluid upon opening movement of the shuttle 27. Typical volumes for a chamber 26 are in the range of between about 0.05 in3 and about 1.0 in3. In a preferred embodiment the component parts of the valve 1, except for seals, are metal.

The shuttle 27 includes a transverse collar 31 positioned preferably generally centrally along the length of the shuttle 27 and between the tubular end portions 28, 29. The shuttle 27 has oppositely directed flow passages 32, 33 each inside a respective tubular portion 28, 29 each having an exterior surface 37, 38 respectively. The flow passages 32, 33 are in selective flow communication with discharge openings 35 through the side walls of the tubular members 28, 29. A wall 39 separates and seals the flow passage 33 from the flow passage 32. Each of the adapters 4, 5 has a skirt 41, 42, respectively, defining an enlarged diametral interior portion 44, 45 respectively for selective receipt therein of the collar 31. The tubular members 28, 29 are coaxial as are the receptacles 24, 25 and the enlarged portions 44, 45. The openings 35 open into the respective portions 44, 45 when the shuttle 27 is in a respective open position. As seen in FIG. 1, the openings 35 on the tubular portion 28 open into the portion 44 with the inlet 19 being in flow communication with the outlet 15. The portions 44, 45 form dampening chambers which function as hereinafter described. The portions 44, 45 have valve seats 51, 52 respectively, each forming one wall of the dampening chambers 26. The collar 31 functions as a movable valve member having opposing faces 54, 55 or seal surfaces to cooperate with the respective valve seat 51, 52 to selectively seal the flow passage 21, 22 from the flow passage 16. As seen in FIG. 1, the surface 55 is engaged with the valve seat 52. A variable volume chamber 26 is formed between the seat 52, surface 55, exterior surface 58 and inside surface 57. Each of the surfaces of the valve seat 51, 52 with the respective surface 56, 57 define collar 31 receiving pockets 59. The adapter 4 has a surface 56 similar to the surface 57 also for partially defining a chamber 26. The fit between the outer surfaces of tubular end portions 28, 29 and the respective surfaces defining the flow passage portions, 24, 25 of the receptacles is such as to control flow of fluid from the respective inlet between the tubular member and the surface of the receptacle 24, 25 and into a chamber 26. It is preferred that this flow bleed gap be minimal and preferably based on the diameter, for valves having a nominal inlet of one inch in diameter that the clearance be in the range of between about 0.0005 and about 0.002 and preferably in the range of about 0.001 and about 0.0018 inches. A flow bleed gap is also between the outer surface of the collar 31 and surfaces 56, 57 with the just described gap dimensions.

The valve 1 as shown in FIG. 1 may be provided in a retrofit kit form. In this event, the kit would contain the adapters 4, 5 and the shuttle 27. These parts would be inserted into an existing valve body 3. To do a retrofit, the existing adapters and shuttle are removed. One of the adapters, for example adapter 4, would then be inserted into the body 3 along with a new seal 10. The shuttle 27 may then be installed by placing the tubular member 28 into the passage 24. The adapter 5 and its seal 10 would then be installed in the body 3 with the adapters 4, 5 being tightened to the desired torque.

Figure 2:
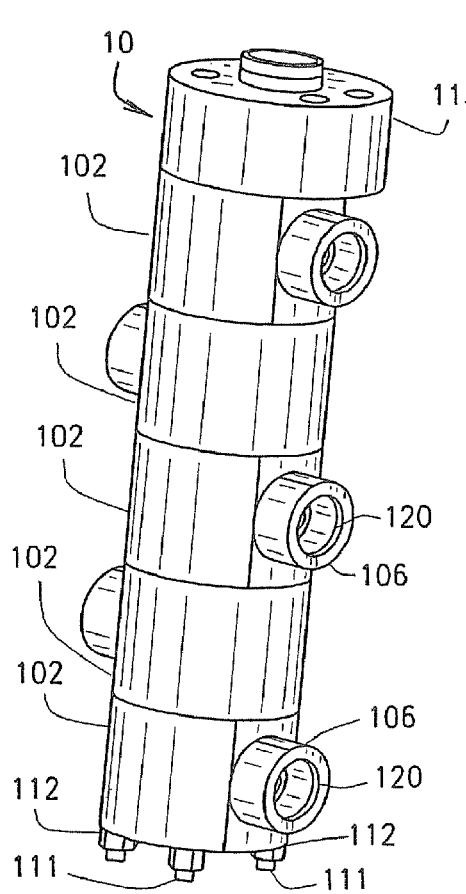
FIG. 2 is a perspective view of a series of shuttle valves associated in ganged relationship.
Figure 3:
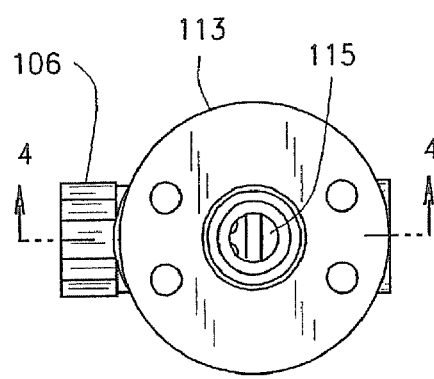
FIG. 3 is end view of the shuttle valve of FIG. 2.
Figure 4:
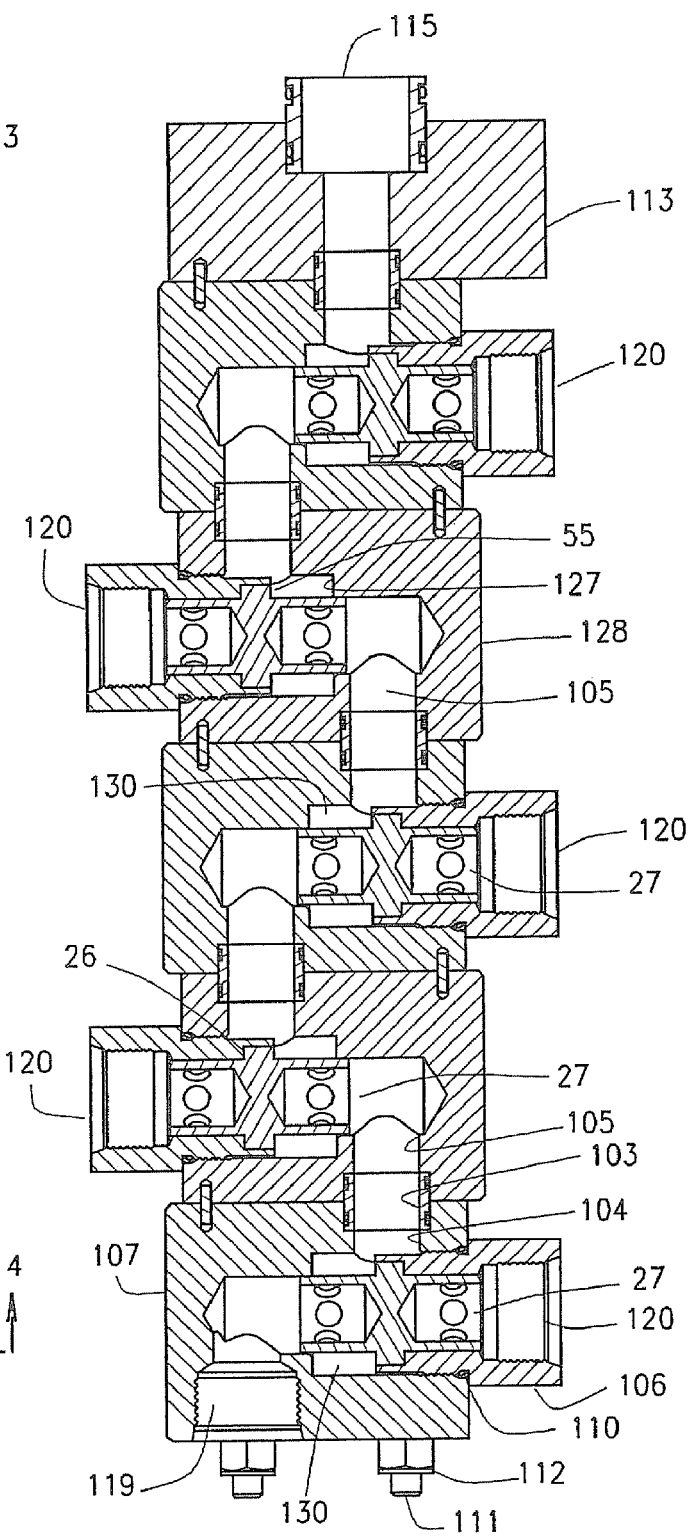
FIG. 4 is a cross sectional view of the shuttle valve of FIGS. 2 and 3 taken along the line 4—4 of FIG. 3.

FIGS. 2–4 illustrate a modified form of the present invention. As shown, a valve structure 101 is formed by a plurality of individual valves 102 connected in series flow communication and secured in ganged relationship forming a zigzag flow passage from inlets 119, 120 to an outlet 115. Any number of valves 102 may be ganged together. Additionally, only one valve element 102 need be used. The plurality of discreet valves 102 are suitably secured together connecting common flow passages via a double sealed annular connector 103 in outlet and inlet passages 104, 105 respectively. Each valve 102 includes an adapter 106 similar in construction to the adapters 4, 5 described above. The adapters 106 are positioned in and sealed to the valve bodies 107 via a suitable seal 110. The outlets 104 constructed and connected to supply upstream fluid to the respective downstream valves 102. As seen, in FIG. 4, pressurized fluid may be supplied to a downstream valve 102 via either an inlet port 120 or the inlet port 119. The valves 102 are secured together in a suitable manner, for example, with threaded rods 111 extending through the valves 102 and threaded into the end cap 113. Threaded hex nuts 112 for example, can then apply an axially directed force to secure the valves 102 together with the end cap 113. Each of the valves 102 contains a shuttle 27 and adapter 106 as described above. A second valve surface 127 is provided and is formed as part of the valve body 128 of a valve 102. The valve seal surface 55 will seat against the valve seat 127 when the shuttle 27 closes off the inlet port 105. The valves 102 work the same as the valve 1, except, there is only one dampening chamber 26 formed and that is formed between the shuttle 27 and the adapter 106. However, the enlarged diametral portion 130 could be sized to form a second dampening chamber 26 if desired.

Figure 5:
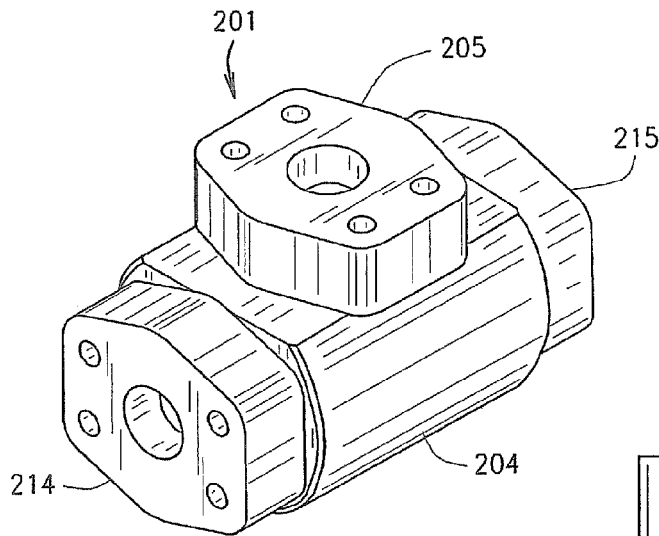
FIG. 5 is a perspective view of the exterior of an alternative embodiment of a shuttle valve.
Figure 6:
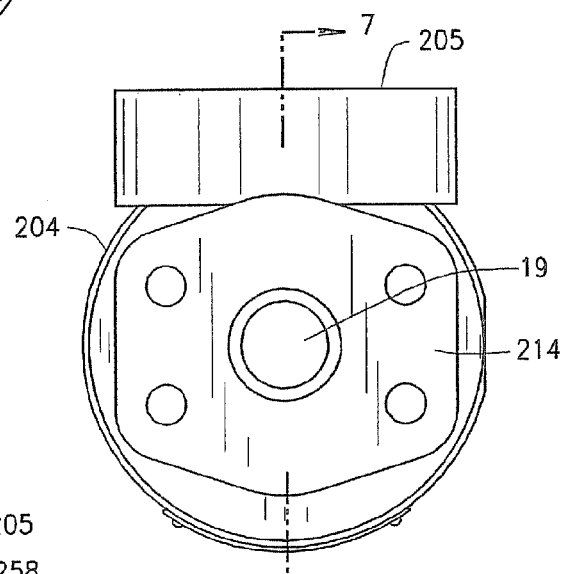
FIG. 6 is an end view of a shuttle valve, as for example as shown in FIG. 5.
Figure 7:
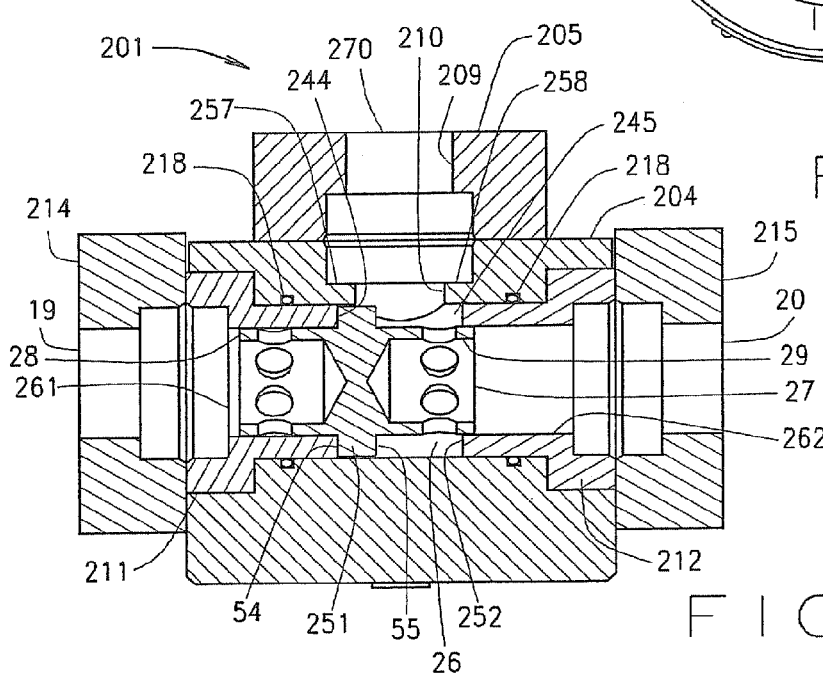
FIG. 7 is a sectional view taken along the line 7—7, FIG. 6, showing an alternative embodiment of the valve shown in FIG. 1.

FIGS. 5–7 illustrate a valve 201 that is formed by retrofitting an existing valve body 204, which can be of form described above for the valve body 3 or it may be of different construction. The valve 201 includes the valve body 204 having mounted thereon a coupling 205. The coupler 205 and valve body 204 have coaxial aligned outlet passages 209 and 210 respectively. A pair of adapters 211, 212 are mounted in the body 204 and are secured in place as by couplers 214, 215 respectively. The adapters 211, 212 are sealed to the body 204 as with O-rings 218. The couplers 205, 214, 215 respectively are suitably secured to the body 204 as with threaded fasteners (not shown). The couplers 205, 214, 215 are also sealed to either the body 204 or the adapters 211, 212. The valve 201 includes a shuttle 27 as described above. Dampening chambers 244, 245 are provided and have valve seats 251, 252 formed as end surfaces of the adapters 211, 212. The valve seats 251, 252 are opposed to one another and are opposed to the adjacent sealing surface 54, 55 respectively. The operation of the valve 201 is similar to the operation of the valve 1. The ends of the chambers 244 and 245 at the outlet passage 210 are also defined by portions 257, 258 on the body 204.

In order to use the retrofit kit, an existing valve body 204 has its internal parts removed. A first adapter 211 is inserted and secured within the valve body 204 through the attachment of the coupling 214. The shuttle 27 is then installed in the valve 201 with the tubular portion 28 in the passageway 261. The adapter 212 is then installed and secured in the valve body 204 receiving the tubular portion 29 in the passage 262. The coupling 215 can be used to secure the adapter 212 in the body 204. A valve is thus formed wherein fluid can enter either the inlet 19 or the inlet 20 for flow through the outlet 270 from the outlet passages 209, 210.

Figure 8:
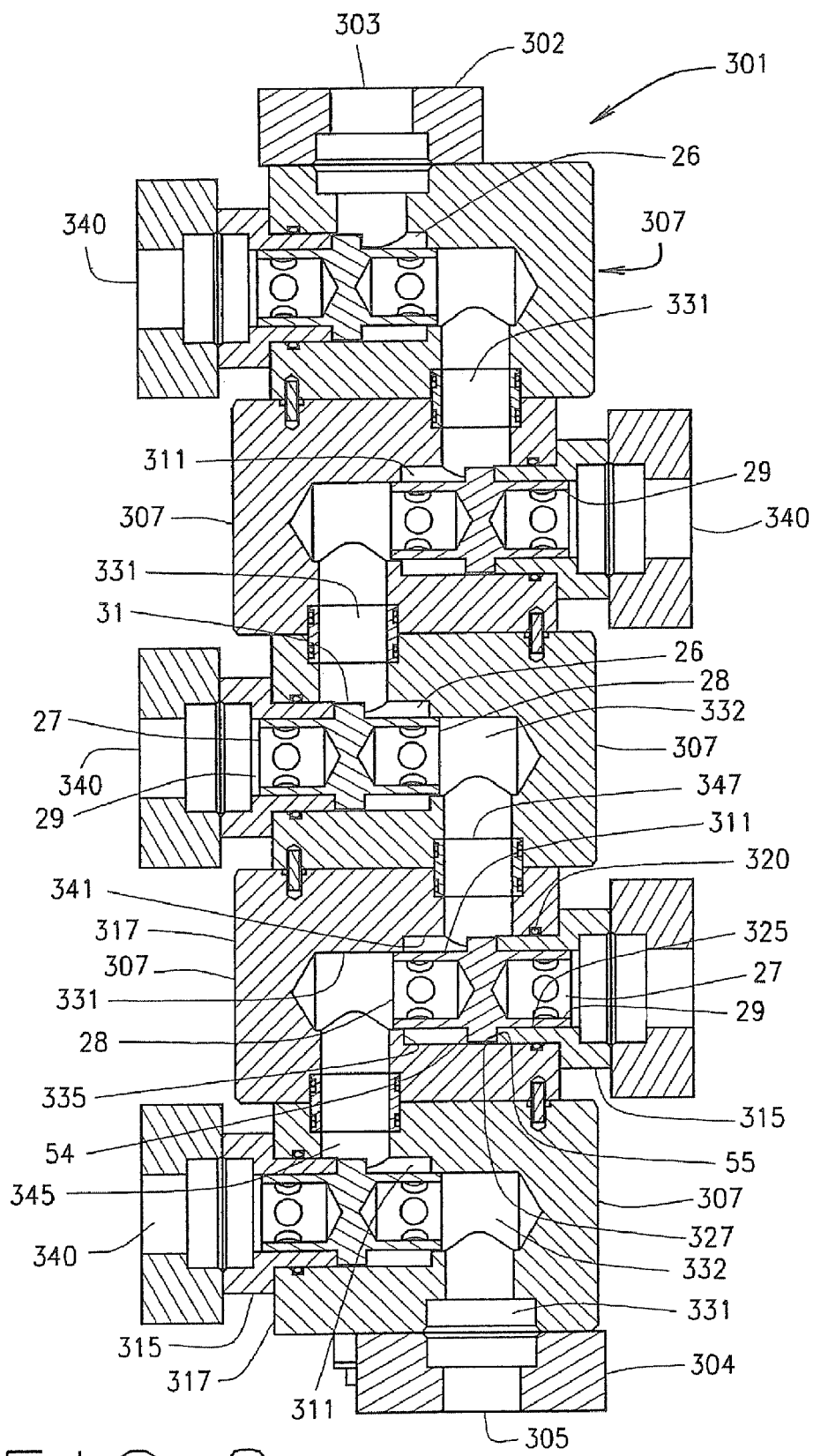
FIG. 8 is a cross section view of a series of ganged shuttle valves wherein the shuttle is controlled in movement in only one direction of opening movement.

FIG. 8 illustrates another embodiment of the present invention. It is similar to the configuration of the ganged valve assembly shown in FIGS. 2–4, i.e., a plurality of valves forming a zigzag passageway from an inlet end to an outlet end and having a plurality of shuttle valves connecting whereby the output of one valve 307 is the pressurized fluid that can operate a downstream valve. The valve assembly 301 is comprised of an end cap 302 at the outlet 303 and an end cap 304 defining an inlet 305. A plurality of valves 307 are connected in series. The general construction of a valve 307 is similar to the construction of the valve 1 and 107 with the exception of there is a right angle turn (as in the valve 107) in an inlet flow passage 331 in each of the valves. Additionally, there is only one dampening chamber 311 in each valve 307 and is on the inlet 331 side of the shuttle 27. The adapter 315 is similar to the adapters 211, 212 and is sealed to the valve body 317 via a suitable seal 320 such as an O-ring. The adapter 315 is secured to the body 317 as for example by a SAE flange connection. The adapter 315 has a through passage 325 for receiving the tubular member 29 therein. The sealing surface 55 will seat against the valve seat 327 in a selective manner. The tubular portion 28 is received in a generally cylindrical flow passage portion 332. The surface 54 will seat against the valve seat 335 in a selective manner. The dampening chamber 311 is defined by the surface 54 valve seat 335 and wall 341. The wall 341 defines an enlarged diametral portion for receipt of the collar 31 therein. The operation of the valves 307 is similar to the valve 1. However, the inlet 331 of one valve 307 downstream of another valve 307 is in flow communication with an outlet 345 of an upstream valve 307. Adjacent inlets 331 and outlet 345 are connected by seal collars 347. An external source inlet 340 can provide pressurized fluid to a valve 307 and downstream valves 307 if there are any downstream valves. The bleed gaps to the dampening chamber 311 are as described herein.

The invention is better understood by description of the operation thereof. Pressurized fluid is supplied to each of the valves, which will be described as the valve 1 herein although the description will apply to the other valve described herein. Pressurized fluid is supplied to the inlets 19 and 20. Pressurized fluid will flow through the valve 1 to the outlet 15 to downstream equipment. When viewed as seen in FIG. 1, pressurized fluid in the inlet 19 exceeds the pressurized fluid in the inlet 20 which urges the shuttle 27 to a position to close the inlet 20 by having the opposing seal surfaces 52, 55 seal against one another. When the pressure in the inlet 20 exceeds that in the outlet 19, the shuttle will move to the left as seen in FIG. 1 urging the opposed sealing surfaces 51, 54 into sealing engagement with one another. The shuttle 27 is a soft start shuttle, i.e., it will start slower and move slower at least initially to dampen its response time to inlet pressure changes thereby slowing the opening of the inlet 20 to the outlet 15 thereby slowing closing of the inlet 19. The dampening chamber will receive fluid as the shuttle moves away from the adapter which was closed. The minimal total gap (difference in diameter) between the outside diameter of the collar 31 and the outside diameter of the portions 44, 45 of the shuttle 27 and the outside diameter of the tubular end portions 28, 29 and the inside diameter of the receptacles 24, 25 restricting the flow of the fluid into the dampening chamber 26 from the higher pressure inlet whereby the shuttle is less susceptible to disruption from momentary pressure changes from the sources of pressurized fluid. It is preferred that the minimal gap be in the range of between about 0.0005 and about 0.002 and preferably 0.001 and about 0.0018 inches for valves generally having a nominal inlet of one inch diameter. By nominal inlet diameter, it is meant the diameters of the receptacles 24, 25. The clearance is such as to provide controlled movement from one valve seat under full pressurized pressure differential to the other valve seat in the range of between about ⅛th to about 1/12th second. The volume of the dampening chamber 26 may also be utilized to control opening time. It is selected to provide a desired opening time. Generally, the larger the chamber volume, the longer the opening time. A preferred shift from one valve seat to the other valve seat will occur in about 1/10th of a second. It is also preferred that the clearance be such that pressure spikes of a duration of 1/13th of a second or less not move the valve from a closed position to an open position. It is preferred that the ratio of the minimal gap to the diameter of the shuttle collar 31 be in the range of between about 0.05% to about 0.2%. Typically in a subsea environment, the dampening force provided by the dampening chamber 26 to the shuttle 27 is preferably at least about 35 pounds for every 100 feet of water depth.

Figure 9:
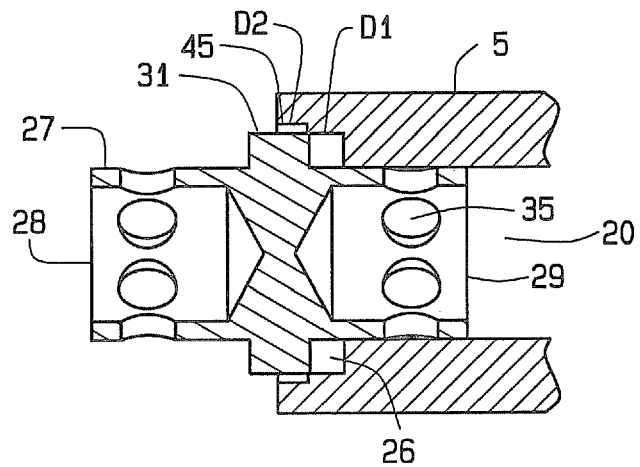
FIG. 9 is a fragmentary sectional view of a first alternative embodiment of a shuttle and dampening chamber.
Figure 10:
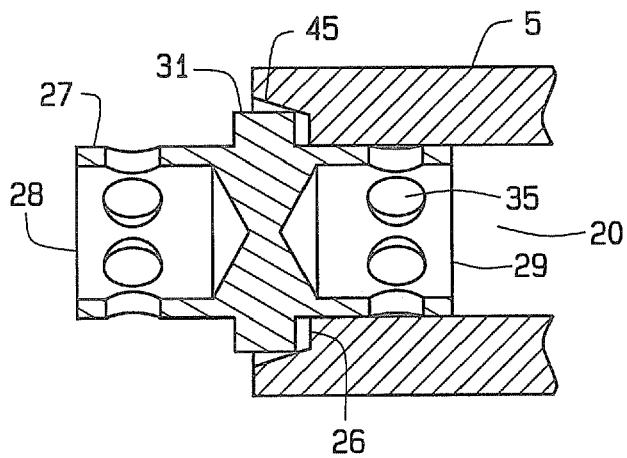
FIG. 10 is a fragmentary sectional view of a second alternative embodiment of a shuttle and dampening chamber.
Figure 11:
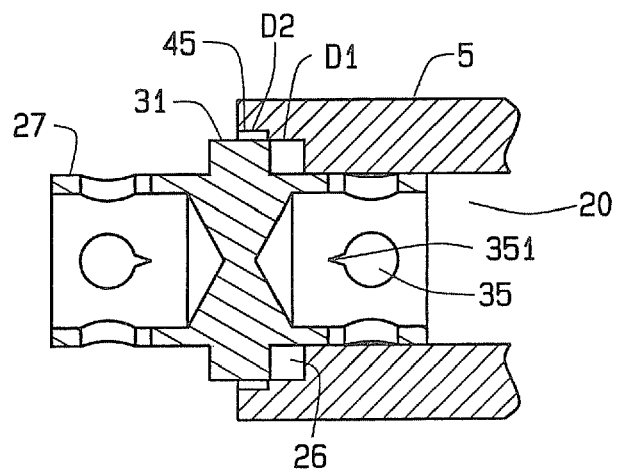
FIG. 11 is a fragmentary sectional view of a third alternative embodiment of a shuttle and dampening chamber.

FIGS. 9, 10 and 11 show various configurations of shuttles 27, adapters, e.g., adapter 5 and dampening chambers 26, all achieving a controlled bleed flow of fluid into the dampening chamber 26. FIG. 9 illustrates an adapter, for example adapter 5, having its enlarged diametral portion 45 having a plurality of diameters D1, D2, etc. Diameter D1 is smaller than Diameter D2 and can have a very tight fit, for example 0.0005 inches difference in diameter. The diameter D2 may have a larger gap for example, 0.0015 inches. Thus, the flow rate of fluid into the dampening chamber 26 will vary as the gap between the outer diameter of the collar 31 and the diameters D1, D2 increase toward the free end of the adapter 5. FIG. 10 shows another variation with certain contours shown exaggerated for clarity. The enlarged portion 45 is tapered with the diameter increasing toward the free end of the adapter 5. Thus, as the collar 31 moves from its closed position to an open position to the left as seen in FIG. 10, the gap between the outside surface of the collar 31 and the surface defining the frustoconical surface of the portion 45 increases allowing fluid to flow into the chamber 26 within increasing volumetric flow rate as the shuttle moves toward a more open position. The taper of the frustoconical section forming the portion 45 of FIG. 10 may be on the order of 0.001 inch to about 0.002 inches over the axial length of the frustoconical section 45 of FIG. 10. FIG. 11 shows another embodiment of the present invention combining two forms of achieving a variable bleed flow. The adapter 5 is similar to that shown in FIG. 9. Having the two diameters D1, D2 providing for a change in the gap between the collar 31 and the surfaces defining the enlarged portion 45. In addition, one or more openings 35 may be provided with a notch 351 on the side adjacent to the collar 31. As the shuttle 7 moves to an open position, the notch 351 will provide a small opening into the chamber 26 to allow fluid to flow from the inlet 20 into the chamber 26 without having to pass through the gaps between the shuttle portions and the adapter. A notch can be triangular in shape or can have a uniform width along its length. In the form of the invention shown in FIGS. 1–8, the openings 35 in the shuttle 27 preferably do not open into the chamber 26 until the collar 31 is outside of its adapter from which it is moving to a more open position from a closed position. The embodiment shown in FIG. 11 permits controlled bleed flow into a dampening chamber 26 from an inlet prior to the collar 31 moving out of the dampening chamber.

It will be appreciated that the above description relates to the preferred embodiments by way of example only. Many variations on the apparatus for delivering the invention will be obvious to those knowledgeable in the field, and such obvious variations are within the scope of the invention as described and claimed, whether or not expressly described.

The invention claimed is:

1. A chatter resistant shuttle valve to direct fluid flow from at least two sources of pressurized fluid to a downstream apparatus, the shuttle valve comprising:

a body engaging a pair of removable opposing coaxial adapters, the first adapter defining a first inlet and the second adapter defining a second inlet, each inlet in fluid communication with a source of pressurized fluid and the body having a transverse outlet in fluid communication with the downstream apparatus;

a first metal valve seat surrounding the first inlet and a second metal valve seat surrounding the second inlet, the metal valve seats being coaxially aligned on opposite sides of the body;

a first lip extending from the body and surrounding the first metal valve seat and a second lip extending from the body and surrounding the second metal valve seat;

an elongate shuttle coaxial with the inlets slidably moving from sealing engagement with the first valve seat to sealing engagement with the second valve seat in response to fluid flow from the sources of pressurized fluid;

the shuttle including a central collar with opposing metal sealing surfaces to engage the first valve seat and a second opposing sealing surface to engage the second valve seat, the shuttle further including opposing first and second tubular end portions, each with an axial bore and a plurality of perforations through the tubular end portion to the bore;

the central collar having a band formed on an outside diameter, the band being sized to alternately slip inside the first lip and the second lip with a minimal gap between the outside diameter of the collar and an inside diameter of the lips;

the first and second tubular end portions of the shuttle sized to alternatively slip inside a first receptacle in the first adapter and a second receptacle in the second adapter with a minimal clearance between an outside diameter of the tubular end portions and an inside diameter of the receptacles;

the collar, the first lip, the first valve seat and the first tubular end portion defining a first dampening chamber that receives fluid as the shuttle moves away from the first adapter, the minimal gap restricting the flow of fluid into the dampening chamber from the outlet and the minimal clearance between the outside diameter of the first tubular end portion and the inside diameter of the receptacle restricting the flow of fluid into the first dampening chamber from the inlet; and the collar, the second lip, the second valve seat and the second tubular end portion defining a second dampening chamber that receives fluid as the shuttle moves away from the second adapter, the minimal gap restricting the flow of fluid into the dampening chamber from the outlet and the minimal clearance between the outside diameter of the second tubular end portion and the inside diameter of the second receptacle restricting the flow of the fluid into the second dampening chamber from the inlet whereby the shuttle is less susceptible to disruption from momentary pressure changes from the sources of pressurized fluid.

2. The apparatus of claim 1 wherein the shuttle will oscillate from sealing engagement with one valve seat to sealing engagement with the opposing valve seat five times or less in response to full differential pressure from the sources of pressurized fluid.

3. The apparatus of claim 1 wherein the amount of time it takes the shuttle to move from sealing engagement with one valve seat to sealing engagement with the opposing valve seat under full differential pressure from the sources of pressurized fluid is in the range of about $\frac{1}{8}$ to $\frac{1}{12}$ second.

4. The apparatus of claim 1 wherein the amount of time it takes the shuttle to move from sealing engagement with one valve seat to sealing engagement with the opposing valve seat under full differential pressure from the sources of pressurized fluid is about $\frac{1}{10}$ second.

5. The apparatus of claim 1 wherein the shuttle does not move from sealing engagement with one valve seat to sealing engagement with the opposing valve seat in respond to pressure spikes having a duration of $\frac{1}{13}$ second or shorter.

6. The apparatus of claim 1 wherein the minimal gap and the minimal clearance are between 0.0005 and 0.002 inches for a valve having nominal inlets of 1 inch diameter.

7. The apparatus of claim 1 wherein the ratio of the minimal gap to the diameter of the central collar of the elongate shuttle is about 0.05% to about 0.2%.

* * * * *